(12) United States Patent
Vodrahalli et al.

(10) Patent No.: US 6,928,200 B2
(45) Date of Patent: Aug. 9, 2005

(54) ULTRA-THIN POLARIZATION MODE CONVERTERS BASED ON LIQUID CRYSTAL MATERIALS

(75) Inventors: Nagesh K. Vodrahalli, Cupertino, CA (US); Achintya K. Bhowmik, San Jose, CA (US); Connie C. Liu, San Jose, CA (US); Takaharu Fujiyama, Los Gatos, CA (US); Kenji Takahashi, San Jose, CA (US); Biswajit Sur, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 108 days.

(21) Appl. No.: 10/265,873

(22) Filed: Oct. 7, 2002

(65) Prior Publication Data

US 2004/0067001 A1 Apr. 8, 2004

(51) Int. Cl.$^7$ ............................................... G02B 6/00
(52) U.S. Cl. ........................................ 385/11; 349/194
(58) Field of Search ...................... 385/11, 14; 349/194

(56) References Cited

U.S. PATENT DOCUMENTS

| | | | | |
|---|---|---|---|---|
| 5,513,196 A | * | 4/1996 | Bischel et al. ................. | 372/22 |
| 6,246,506 B1 | * | 6/2001 | Kobayashi et al. .......... | 359/246 |
| 6,546,161 B2 | * | 4/2003 | Okuno et al. ................. | 385/14 |
| 6,594,408 B1 | * | 7/2003 | Noe ............................. | 385/11 |
| 6,641,662 B2 | * | 11/2003 | Radojevic et al. ............. | 117/2 |

OTHER PUBLICATIONS

Dupre, Donald B., "Liquid Crystals", *Kirk–Othmer Concise Encyclopedia of Chemical Technology*, A Wiley–Interscience Publication, John Wiley & Sons, (1985), 703–705.

Inoue, Yasuyuki, "Elimination of Polarization Sensitivity in Silica–Based Wavelength Division Multiplexer Using a Polyimide Half Waveplate", *Journal of Lightwave Technology*, vol. 15, No. 10, Oct. 1997, 1947–1957.

* cited by examiner

Primary Examiner—John D. Lee
Assistant Examiner—Jennifer Doan
(74) Attorney, Agent, or Firm—Schwegman, Lundberg, Woessner & Kluth, P.A.

(57) ABSTRACT

A method and apparatus that includes a first waveguide segment that differentially changes the amplitude of the light relative to a first polarization orientation, a thickness of oriented liquid crystal or other birefringent material sufficient to delay one polarization component one-half wavelength relative to another, and a second waveguide segment that also differentially changes the amplitude of the light based on the polarization orientation. Also, an apparatus that includes a thin polarization converter that includes a thin first substrate that is substantially transparent to a wavelength of light, and a birefringent material deposited on one or more surfaces of the first substrate and oriented such that the polarization converter forms a half-wavelength birefringent plate for the light. Also, an apparatus having a first substrate surface, a second substrate surface, and a liquid crystal material between the first and second substrate surfaces to form a polarization converter.

20 Claims, 8 Drawing Sheets

ULTRA-THIN POLARIZATION MODE CONVERTERS BASED ON LIQUID CRYSTAL MATERIALS

FIELD OF THE INVENTION

This invention relates to the field of optics, and more specifically to half-wave polarization converters formed by e.g., sandwiching liquid crystal material between ultra-thin substrates or within a thin slot, or by depositing birefringent material on one or both surfaces of a thin substrate.

BACKGROUND OF THE INVENTION

Optical amplifiers can be implemented by providing a gain medium in the optical path of a light signal, for example, by forming an optical waveguide on a substrate. A gain medium typically requires an inverted population, in which more atoms or molecules are in an excited state than are in a state having less energy. A semiconductor junction can provide the electrical pump energy needed to obtain an inverted population in a gain medium. Optical pumping can also be used.

The term "laser" refers to the amplification of light by the stimulated emission of radiation. Lasers include a gain medium and a feedback mechanism. Energy is added to the gain medium to induce a population inversion, wherein the lasing species has more electrons in an outer shell (or high-energy state) than in an inner shell (or low-energy state). Interaction from a passing photon with a species having an inverted state can induce stimulated emission, wherein two photons are output, each having the same wavelength, phase, and polarization as the input photon. This gain in the number of photons provides the amplification needed by the laser.

In a laser, an active material, for example, a semiconductor, or a glass suitably doped with an active atomic species such as neodymium, is placed in a cavity resonator with a feedback path formed by, e.g., two reflecting or at least partially reflecting mirrors.

The laser will predominately output light having the characteristics (modes) that are amplified the most. These modes result from an interaction of the optical feedback and filtering with the inverted population (the characteristics of the source of energy). The modes include such characteristics as the spatial shape and spreading of the laser beam, its polarization(s), wavelength(s), etc. Since there will be a fixed amount of input energy available in the laser, once one mode is amplified even slightly more than another mode, that one mode will take more of the available energy (becoming the dominant mode), leaving less energy for the other modes. Various parts of the laser beam (e.g., across its cross section) can lase in different modes. Modes can also vary over time.

In a gain medium of a laser or an amplifier, the interaction of light in the waveguide and the surface of the substrate can differentially filter orthogonally polarized components of the laser beam. That is, one linear polarization mode can be suppressed, while the orthogonal polarization mode may not be. Thus, solid-state lasers having waveguides formed at the surface of a substrate will tend to lase with polarized modes, at least to some extent. Amplifiers having waveguides formed at the surface of a substrate will tend to amplify one polarized mode more than another, at least to some extent.

There is thus a need to provide a compensation mechanism that counteracts or interacts with the effect of waveguide polarization, in order to obtain a desired overall polarization function (such as no differential gain between polarization modes).

DESCRIPTION OF THE PREFERRED EMBODIMENTS

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. The same reference number or label may refer to signals and connections, and the actual meaning will be clear from its use in the context of the description.

Introducing a specially designed wave plate within the feedback path of a laser can alter the phase relationship of various polarization components of the laser beam, and thus affect the mode of the laser. Such a wave plate can be used to shift the polarization relationship in a light beam.

Some wave plates work by delaying one of two orthogonally polarized components of light incident upon them. The materials in the wave plate are asymmetric relative to polarized light in that they have a different index of refraction in one polarization direction than the other. The index of refraction corresponds to the speed of light through a material, so the component of light having a polarization along one axis of the plate will travel faster that the component of light having the orthogonal polarization, causing a phase shift of one component relative to the other. The "fast" axis is often indicated on the wave plate. In a "half-wave retardation plate" (as the term is used herein), the two orthogonally polarized components of light enter the wave plate with a phase difference of zero and emerge with a phase difference of pi (180 degrees), corresponding to a ½-wavelength delay. This switches the polarization components of the beam.

Figure 5:
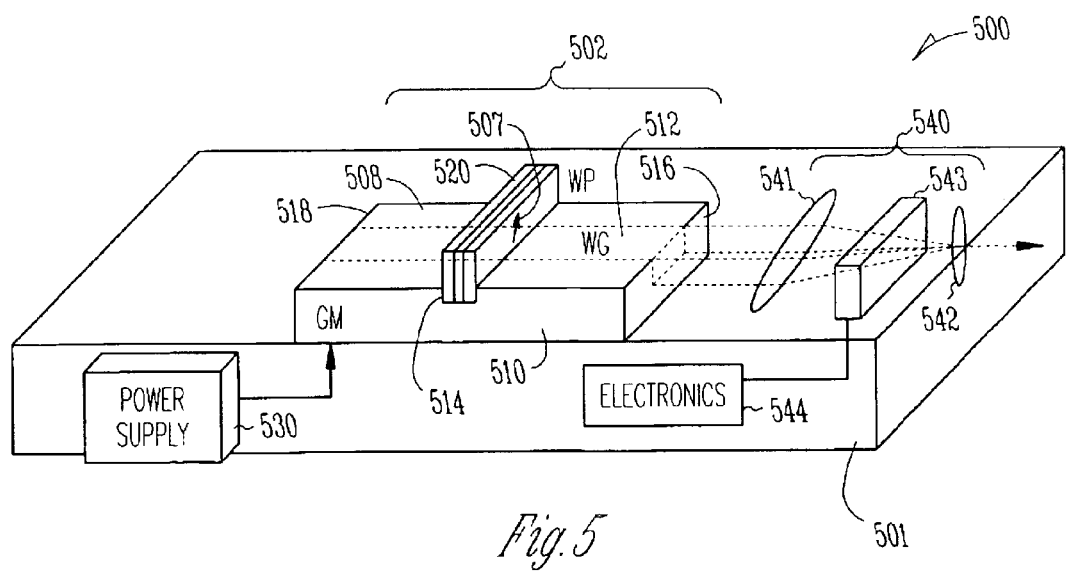
FIG. 5 shows an isometric view of a laser system 500 using the present invention.

In some embodiments, the present invention provides a waveguide divided into two substantially identical halves (such as shown in FIG. 5 below), each of which has polarization-dependent gain of about the same amount. Suppose the light beam has two initial components called an X-direction polarization component and a Y-direction polarization component. The gain added to the X component in the first waveguide half is different than the gain added to the Y component. The half-wave polarized plate is placed in the light path between the two waveguide halves, and switches the polarization components of the beam. Since the X-direction polarization component has an amount of X-direction polarization-sensitive gain added to it by the first half waveguide, and is then switched to the Y-direction by the half-wave polarized plate and then has an amount of Y-direction polarization-sensitive gain added to it by the second half waveguide, and the Y-direction polarization component has an amount of Y-direction polarization-sensitive gain added to it by the first half waveguide, and is then switched to the X-direction by the half-wave polarized plate and then has an amount of X-direction polarization-sensitive gain added to it by the second half waveguide, both components are provided the same amount of gain. The output beam will have gain that is the average of the X-direction gain and the Y-direction gain of the two halves of the waveguide. Thus, the overall waveguide-plate device has gain that is polarization-independent.

In some embodiments, passive devices have waveguides that incur "polarization-sensitive loss" that is compensated for by using this method as well. Such passive photonic devices include arrayed waveguide gratings and other integrated photonic devices having polarization-sensitive loss.

In some embodiments, the removal of polarization sensitivity of waveguide gain or loss is critical to the functionality of certain planar photonic devices.

In some embodiments, the half-wave polarized plate has a polarization orientation that is pointed at a forty-five degree angle relative to the plane of the surface of the waveguide substrate. Such an orientation provides the desired switching of the X and Y polarization components.

In some embodiments, a simple, straight waveguide is provided for the first half waveguide, and a substantially identical simple, straight waveguide is provided for the second half waveguide. In other embodiments, a more complex waveguide structure, such as an arrayed waveguide grating, is used for each of the two substantially identical halves, thus eliminating the polarization dependence of the overall structure. Equivalently, a complex waveguide structure is divided into two substantially identical halves, perhaps having multiple waveguides in each half meeting in the middle, and a half-wave retardation plate is placed in that middle location across all the waveguides there.

Figure 1:
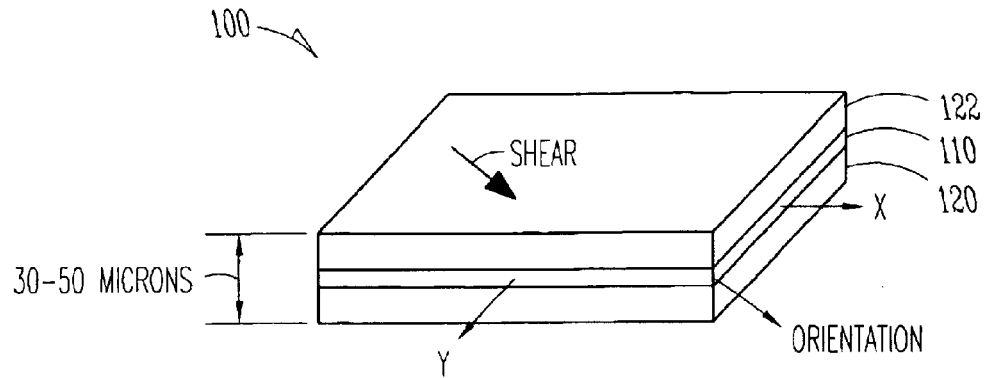
FIG. 1 shows a half-wave polarized plate 100 of one embodiment of the present invention.

FIG. 1 shows a half-wave polarized plate 100 of one embodiment of the present invention having a liquid crystal material 110 with high birefringent properties spread between two thin substrate plates 120 and 122 and oriented in a desired direction. In some embodiments, the orientation direction is pointed at a forty-five degree angle relative to the plane of the surface of the waveguide into which half-wave polarized plate is placed.

In some embodiments, thin substrate plates 120 and 122 are each made of glass approximately twenty-five to thirty microns (micrometers) thick. In some embodiments, standard liquid crystal materials having a typical birefringence of 0.15 to 0.20 are used. The thickness of the liquid crystal layer 110 depends on the amount of birefringence of the material used. In some embodiments, the liquid crystal layer 110 is oriented (to provide a polarization orientation that will be forty-five degrees to the surface plane of the waveguide).

In other embodiments, substrate 120 is a thin glass sheet, and substrate 122 is a thin polymer sheet (such as polyamide), in order to form a thinner half-wave polarization converter plate 100. In some embodiments, thinner polarization converters reduce insertion loss of the device. In yet other embodiments, polymer sheets are used for both substrate plates 120 and 122. In yet other embodiments, quartz sheets are used for both substrate plates 120 and 122.

Figure 2:
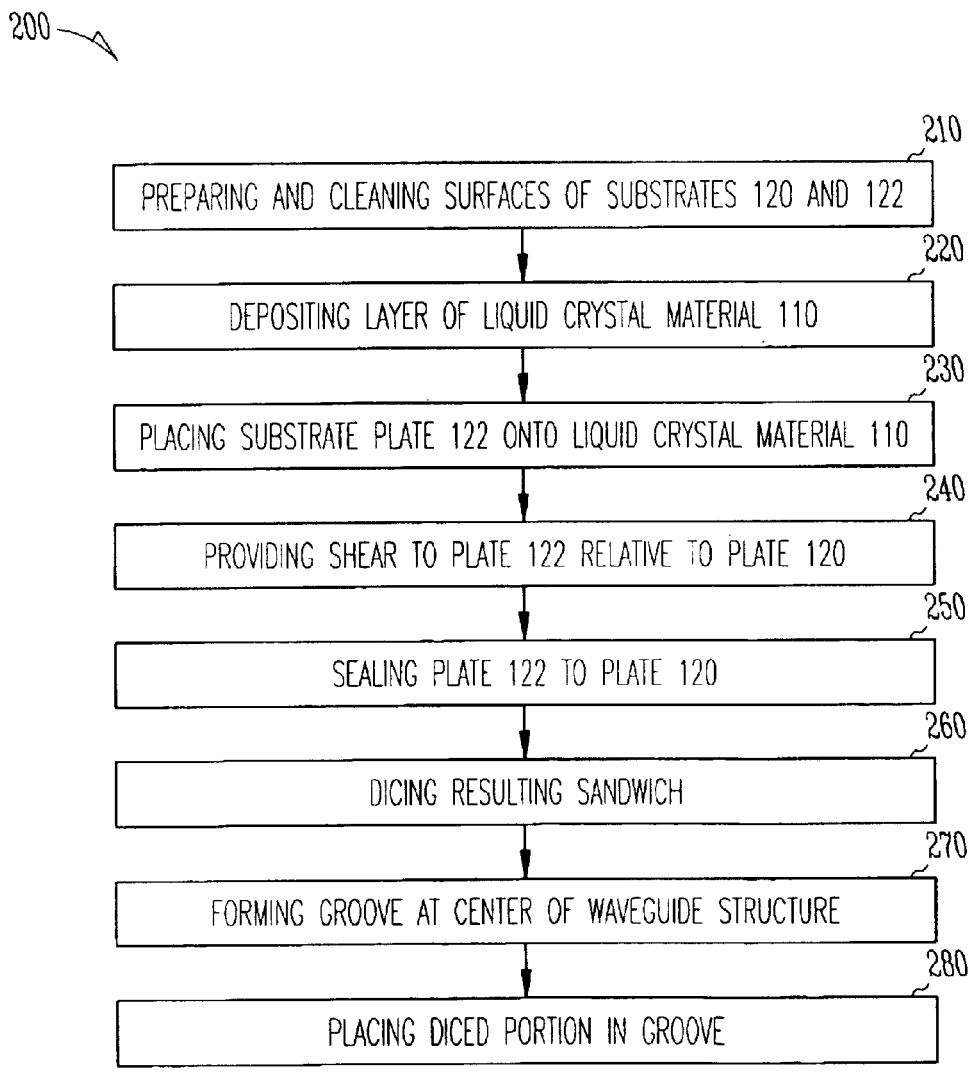
FIG. 2 shows a method 200 used in the present invention.
Figure 3A:
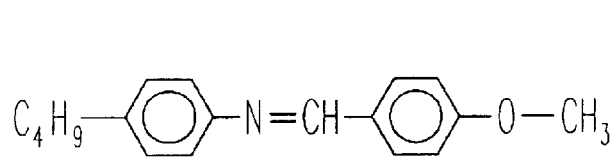
FIG. 3A, 3B, 3C, 3D show four liquid crystal materials 310, 320, 330, 340, respectively, that are used in various embodiments of the invention.
Figure 3B:
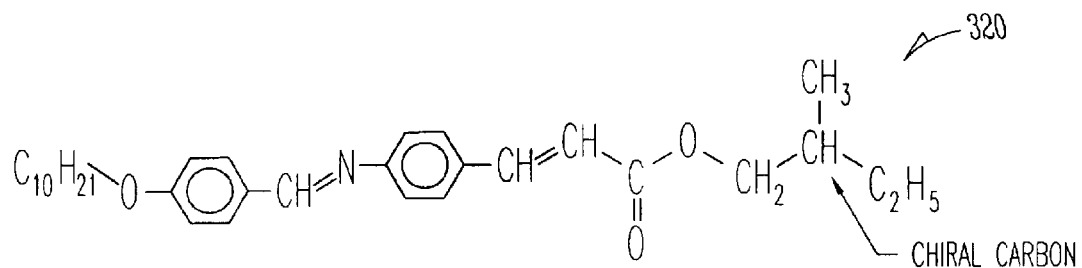
Figure 3C:
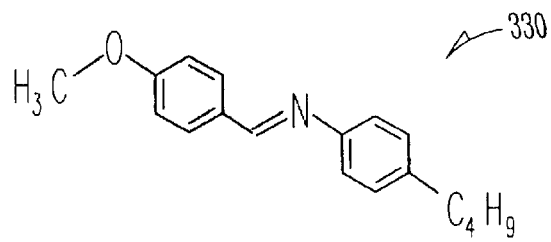
Figure 3D:
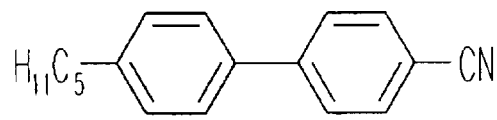

FIG. 2 shows a method 200 used in the present invention. In some embodiments, orientation is achieved by preparing and cleaning 210 the surfaces of substrate plates 120 and 122, depositing 220 a layer of the liquid crystal material 110 onto the prepared surface of substrate plate 120 with a target thickness of two to five microns, placing 230 the top substrate plate 122 onto the liquid crystal material 110 and providing shear 240 of the top plate 122 relative to the bottom plate 120 (motion of the plane in a parallel direction) in order to orient molecules of the liquid crystal material film 110, and sealing 250 the top plate 122 to the bottom plate 120. In some embodiments, the resulting sandwich is diced 260 to a desired size, e.g., 1 cm by 15 cm. In some embodiments, a groove is formed 270 at the center of the waveguide structure and the diced portion is placed 280 in the groove.

FIGS. 3A, 3B, 3C, and 3D show four liquid crystal materials 310, 320, 330, 340 respectively, that are used in various embodiments of the invention. In some embodiments, liquid crystal material 310, methoxybenzilidene butylanaline ("MBBA"), is used for layer 110 of FIG. 1. In other embodiments, liquid crystal material 320, p-decyloxybenzylidene p'-amino 2-methylbutylcinnamate ("DOBAMBC"), is used for layer 110 of FIG. 1. In yet other embodiments, liquid crystal material 330, CH3-O—Ph—CH=N—Ph—C4H9, is used for layer 110 of FIG. 1. In still other embodiments, liquid crystal material 340, C5H11-Ph—Ph—CN, is used for layer 110 of FIG. 1. Other embodiments use other liquid crystal materials.

Figure 4A:
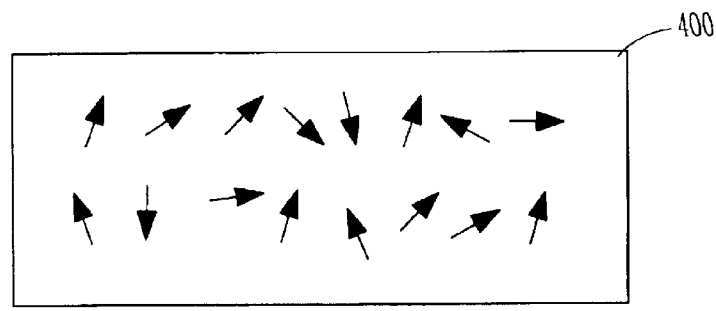
FIG. 4A shows a representation of a liquid crystal film 400 having a random orientation of molecules.

FIG. 4A shows a representation of a liquid crystal film 400 having a random orientation of molecules.

Figure 4B:
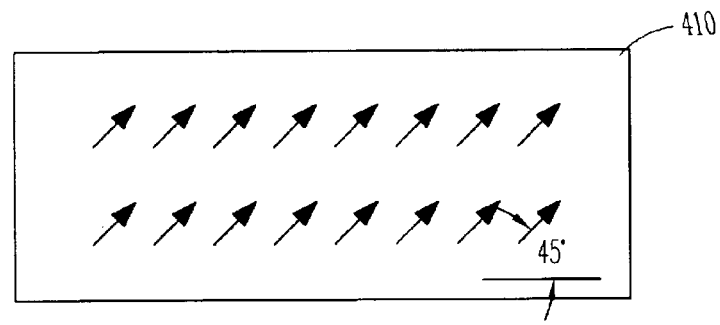
FIG. 4B shows a representation of a liquid crystal film 410 having uniaxial orientation of molecules.

FIG. 4B shows a representation of a liquid crystal film 410 having uniaxial orientation of molecules, due to, e.g., shear stress resulting from a surface pretreatment of the materials used for one or both of the facing walls into which the film is formed.

FIG. 5 shows a perspective schematic view of a waveguide device system 500 according to one aspect of the invention. System 500 in enclosure 501 includes a waveguide 512 formed at surface 508 of substrate 510. Total reflecting mirror 518 and partially reflecting mirror 516 and waveguide 512 form a laser cavity 502. Polarization converter 520 (implemented, for example, as half-wave polarized plate 100 of FIG. 1) is placed in slot 514 that is formed at substantially the midpoint of waveguide 512. The polarization direction 507 is at a forty-five degree angle to surface 508. In this embodiment, the output light beam of laser 502 is further processed by output optics such as lens 541 and lens 542, and amplitude modulator 543, which is controlled by electronics 544 to, e.g., impart a data stream onto the light. Power supply 530 provides pump power (via either electrical or optical energy) to the laser 502. System 500 is one example of an entire system built around a polarization converter 520 such as device 100 of FIG. 1. In other embodiments, polarization converter 520 is implemented in other ways, such as polarization converter 620 of FIG. 6, or polarization converter 700 of FIG. 7.

Figure 6:
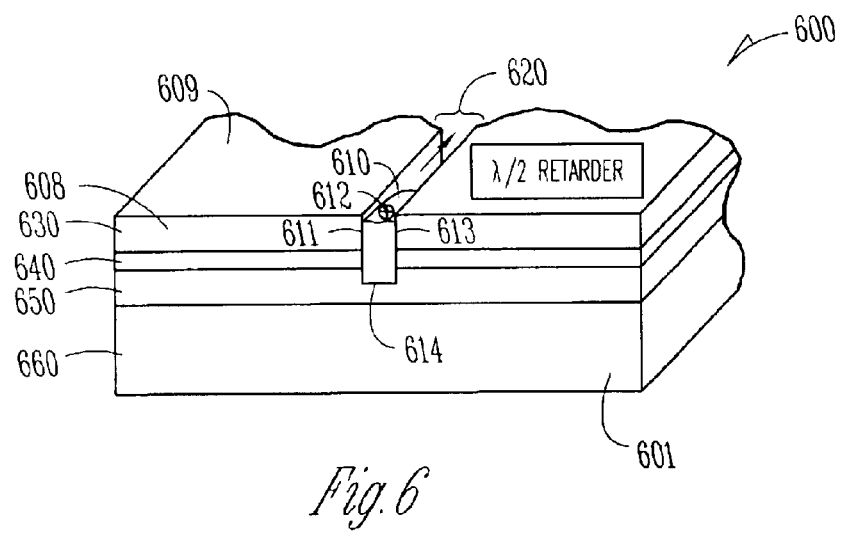
FIG. 6 shows a side schematic view of a waveguide device 600 according to one aspect of the invention.

FIG. 6 shows a perspective schematic cross-section view of a waveguide device 600 according to one aspect of the invention. Device 600 includes a waveguide 640 formed as a core between an upper cladding layer 630 and a lower cladding layer 650, which is formed on a substrate 660. A vertical groove or slot 614, having side faces 611 and 613, is formed at a midpoint of waveguide 640 (e.g., through clad 630, through waveguide 640 and possibly partially into clad 650), and filled with liquid crystal material 610 to form polarization converter 620. Note that in the finished product, liquid crystal material 610 is typically solidified to make permanent its polarization direction, rather than remaining a liquid, but will still be referred to as a "liquid" crystal material. Groove 614 is made thick enough to provide the proper thickness of film 610. In some embodiments, surface contact 612 is made to film 610 and shear is applied in the direction shown (i.e., parallel to the length of the groove and perpendicular to the cross-sectional face 608 into the FIG. 6 drawing and to the length axis of waveguide 640, in order to orient the molecules at a forty-five degree angle to top face surface 609 of device 600. In other embodiments, the inner surfaces of groove 614 are stressed, crystal oriented, or polished at a forty-five degree angle such that the molecules of film 610 align themselves to that forty-five degree angle relative to surface 609. In this way, the alignment of the molecules is self-aligned into a groove of the appropriate dimensions to achieve a birefringent half-wave polarization converter for waveguide 640.

In some embodiments, groove 614 is less than two microns thick, in order to provide an ultra-thin transverse electric/transverse magnetic (TE/TM) polarization converter, used, without introducing significant loss, to remove polarization sensitivities of optical circuits. In some embodiments, an arrayed waveguide grating device (AWG device) having a complex waveguide configuration is bisected by a groove 614 in order that polarization sensitivities of the AWG are minimized. In other embodiments, an optical switch is bisected.

In some embodiments, a liquid crystal material, such as one selected from the four shown in FIG. 3, is dissolved in an appropriate solvent, and deposited in slot 614. The solvent is then evaporated leaving a thin birefringent layer. The thickness and polarization orientation is controlled to provide half-wave relative retardation to the propagating optical radiation. In some embodiments, slot 614 is filled with the birefringent liquid crystal material. In other embodiments, a thin layer of the birefringent liquid crystal material is formed on both faces of slot 614, and an optical index-matching material is used to fill the remaining portion of slot 614.

In some embodiments, a liquid crystal material having a birefringence of delta n=0.5 is used, and a total thickness of the half-wave plate film is 1.55 micrometers is used for 1550 nm wavelength infrared light ($l_{hwp}$=wavelength/2 times delta n). In some embodiments, the insertion loss of a thin polarization converter 612 is approximately less than 0.05 dB. In contrast, one conventional polarization converter made from stressed polyimide is approximately 14.5 microns thick, has a birefringence of about 0.053, and results in an excess loss of about 0.4 dB. Another reported polarization converter medium is 92-micron thick crystal quarts having an excess loss of as much as 5 dB.

Note that polarization converter 620 is oriented to swap the polarization components of the light beam that are amplified or attenuated by different amounts in waveguide 640. Typically, those polarization components are the component parallel to surface 609 and the component perpendicular to surface 609 (e.g., where the perpendicular component has the maximum gain and the parallel component has the minimum gain, or where the parallel component has the maximum gain and the perpendicular component has the minimum gain) and for that case, polarization converter 620 is oriented at a forty-five degree angle to surface 609. For other cases, polarization converter 620 is oriented at a forty-five degree angle to the component with the maximum gain (or minimum attenuation).

Figure 7:
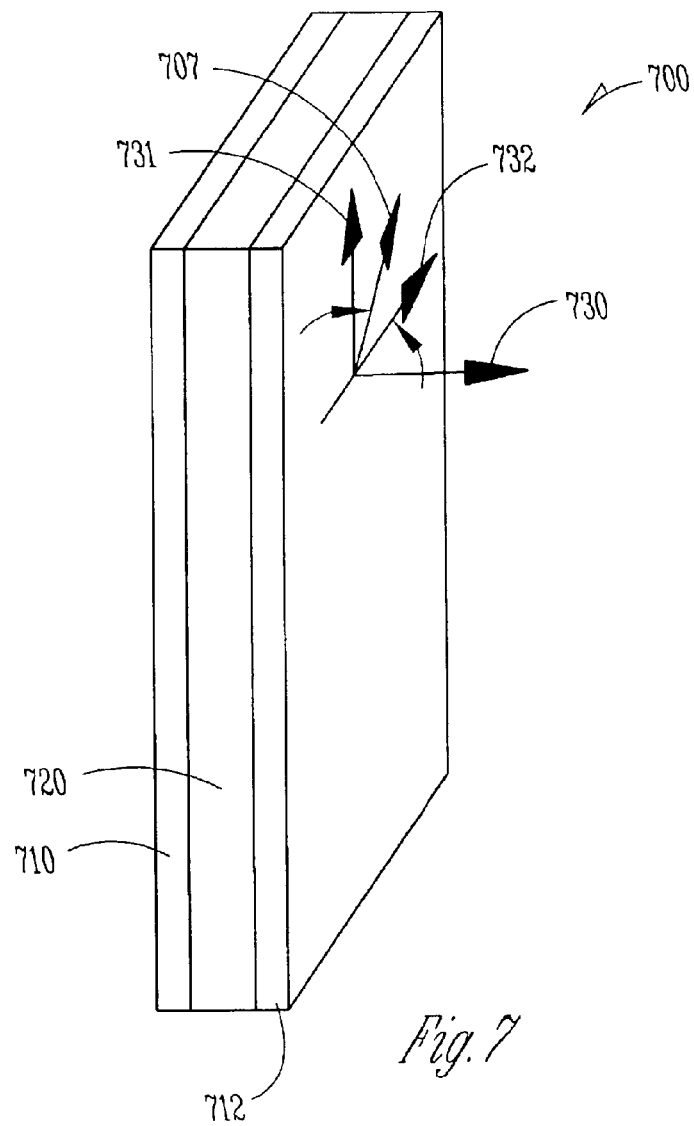
FIG. 7 shows a half-wave polarized plate 700 with high birefringent properties deposited on at least one face of substrate 720, and polarization-oriented in a desired direction 707.

FIG. 7 shows a half-wave polarized plate 700 of one embodiment of the present invention having a birefringent material 710 with high birefringent properties deposited on at least one side of substrate 720, and polarization-oriented in a desired direction 707. In some embodiments, the orientation direction 707 is pointed at a forty-five degree angle relative to the polarization component 732 having the minimum gain (i.e., in FIG. 7, the propagation direction 730 of a light beam along a waveguide has minimum gain in direction 732 and maximum gain in direction 731 perpendicular to direction 732). For example, in some embodiments, the direction 707 is at a forty-five degree angle to a surface adjacent to waveguide 512 (see FIG. 5, but where polarization converter 520 is replaced by a plate 700 of FIG. 7). In other embodiments, the polarization direction 707 is pointed at an angle that is half way between the polarization direction of maximum gain and the polarization direction of minimum gain.

In some embodiments, birefringent material 710 is deposited on one side of substrate 720, and an equivalent thickness of birefringent material 712 is deposited on an opposing side of substrate 720, wherein the thickness of birefringent material 710 and the thickness of birefringent material 712 are specific to provide an overall half-wave polarized plate (i.e., where a first polarization component is delayed one-half wavelength relative to the other polarization component that is perpendicular to the first). In other embodiments, birefringent material 710 is deposited on only one side of substrate 720 to a thickness to provide a half-wave polarized plate.

In some embodiments, substrate 720 is glass. In some such embodiments, a glass substrate of about 25 microns thick is used. In other embodiments, substrate 720 is quartz, or a thin polymer film such as Kapton(R) or polyethylene. In some such embodiments, a polymer thickness of about 15 microns is used.

In some embodiments, the birefringent material is a film of TiO2 having a birefringence of 0.247. In some such embodiments, a film thickness (i.e., the total thickness of films 710 and 712, or of film 710 if only one side has such a film) of about 3 microns is used to provide half-wave retardation at 1550 nm. In other embodiments, the birefringent material is a film of LiNbO3 having a birefringence of 0.073 (in some such embodiments, a film of about 10 microns is used). In other embodiments, the birefringent material is a film of Ta2O5. In still other embodiments, a liquid crystal material such as described above is used (i.e., applies in a solvent, and the solvent then evaporated to leave the solid oriented liquid crystal material film on one or both sides of substrate 720).

Figure 8A:
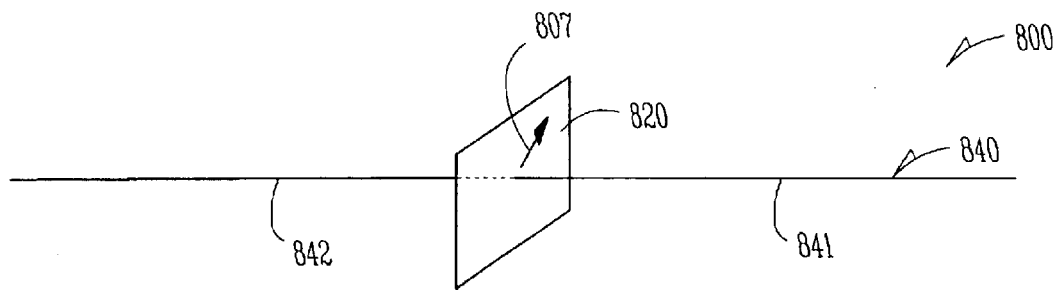
FIG. 8A shows a polarization compensated waveguide system 800 with a single polarization converter 820 bisecting waveguide 840.

FIG. 8A shows a polarization compensated waveguide system 800 with a single polarization converter 820 bisecting waveguide 840. In various embodiments of the devices of FIGS. 8A, 8B, 8C, and 8D, polarization converter 820 is the polarization converter 100 of FIG. 1, polarization converter 620 of FIG. 6, or polarization converter 700 of FIG. 7. FIG. 8A is the general case of the devices described above, wherein the waveguide segment 841 has the same gain or attenuation characteristics as waveguide segment 842. In some embodiments, waveguide segment 841 is the same length as waveguide segment 842 and has a polarization sensitivity that is perpendicular to a substrate surface adjacent to waveguide 840, and the polarization orientation of polarization converter 820 is at a forty-five degree angle to that substrate surface.

Figure 8B:
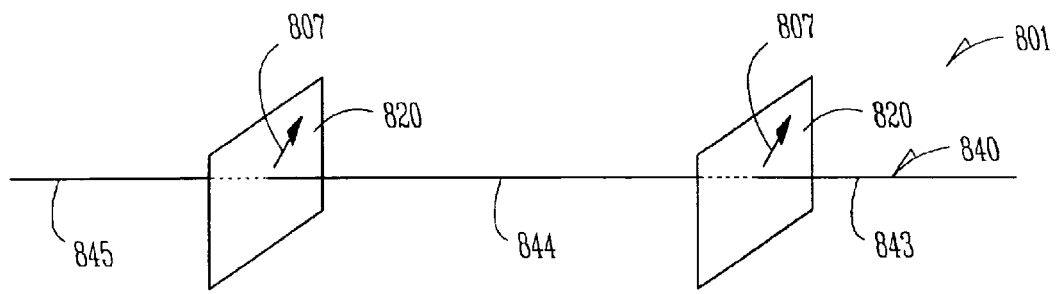
FIG. 8B shows a polarization compensated waveguide system 801 with two polarization converters 820 each bisecting half of waveguide 840.

FIG. 8B shows a polarization compensated waveguide system 801 with two polarization converters 820 each bisecting respective halves of waveguide 840. In such a system, the left-hand polarization converter 820 swaps the vertical and horizontal polarization components (relative to a substrate surface denoted as horizontal), and the right-hand polarization converter 820 re-swaps the vertical and horizontal polarization components back to their original orientations. Thus, any polarization in the original beam is restored, while the gain or attenuation imparted is equal to all polarization components. In the embodiment shown, waveguide segment 843 is one quarter of the entire waveguide length, waveguide segment 844 is one half of the entire waveguide length, and waveguide segment 845 is one quarter of the entire waveguide length. Since sum of the lengths of segments 843 and 845 (where the light beam has its original polarization orientation) is equal to the length of segment 844 (where the light beam has its vertical and horizontal polarization components swapped), both polarization components have the same gain (i.e., if waveguide 840 is a gain medium) or attenuation (if waveguide 840 is a passive device). In some such embodiments, the polarization orientations 807 of polarization converters 820 are each at forty-five degrees relative to a surface adjacent to waveguide 840.

Figure 8C:
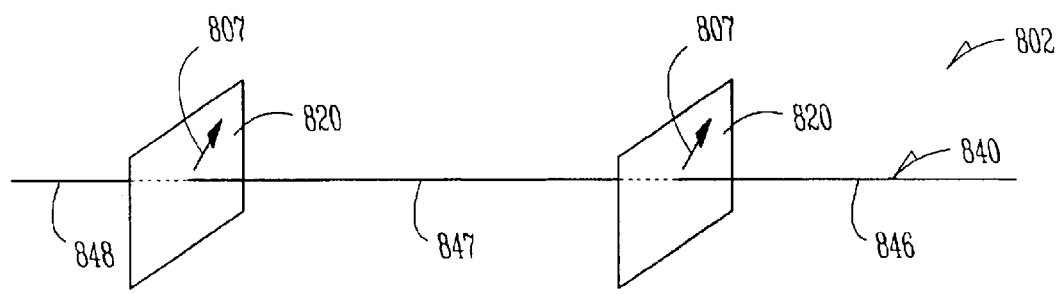
FIG. 8C shows a polarization compensated waveguide system 802 having two polarization converters 820 dividing unequal-length sections of waveguide 840.

FIG. 8C shows a polarization compensated waveguide system 802 having two polarization converters 820 dividing unequal-length sections of waveguide 840. This configuration is similar to that of FIG. 8B in that the sum of lengths of segments 846 and 848 equal the length of segment 847, however segment 846 has a different length than segment 848. The result, though, is the same as FIG. 8B in providing the same gain or attenuation to both polarization components, while maintaining the polarization orientation of the input beam to the output beam.

Figure 8D:
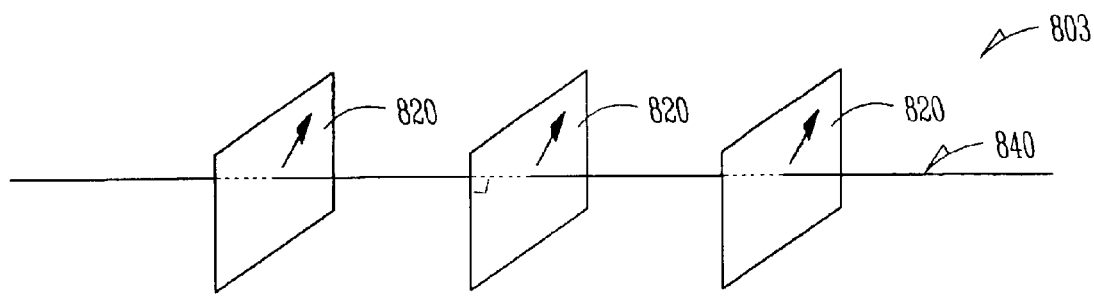
FIG. 8D shows a polarization compensated waveguide system 803 with three polarization converters 820 dividing waveguide 840.

FIG. 8D shows a polarization compensated waveguide system 803 with three polarization converters 820 dividing waveguide 840. In some such embodiments, the polarization orientations 807 of polarization converters 820 are each at forty-five degrees relative to a surface adjacent to waveguide 840. This configuration swaps the polarization components three times, thus the output beam has the polarization components swapped relative to the input beam, as was the case for FIG. 8A. In some such embodiments, the polarization orientation 807 of the three polarization converters 820 are each at forty-five degrees relative to a surface adjacent to waveguide 840, and each waveguide segment is the same length. In other embodiments, other numbers of polarization converters 820 are used, and/or different length segments are formed.

Figure 8E:
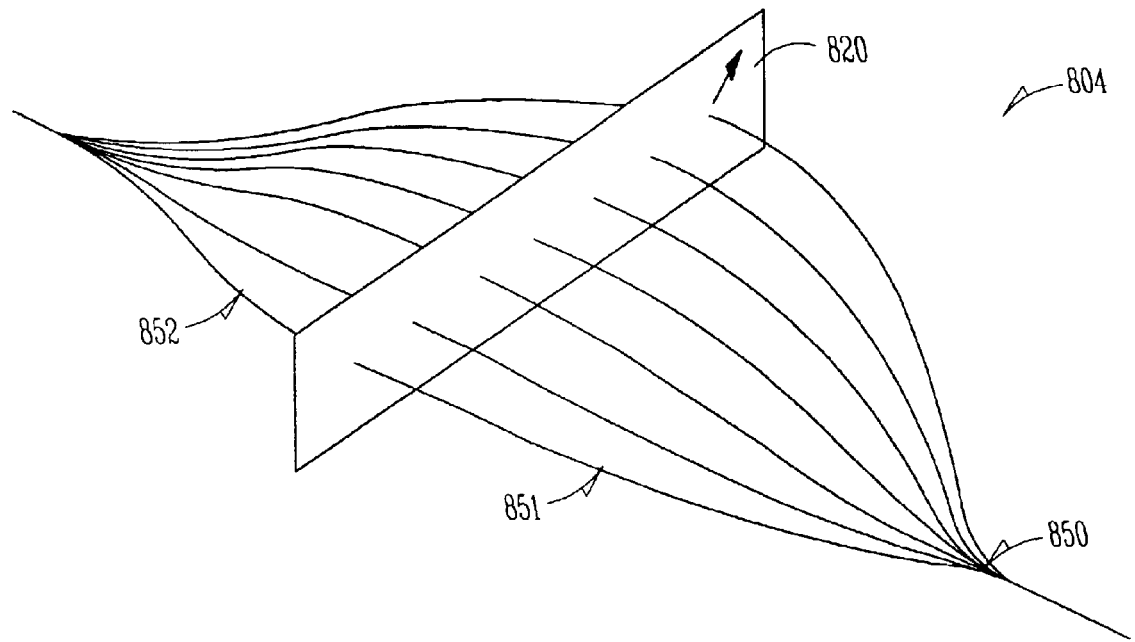
FIG. 8E shows a polarization compensated waveguide system 804 with polarization converter 820 dividing arrayed waveguide device 850.

FIG. 8E shows a polarization compensated waveguide system 804 with polarization converter 820 dividing arrayed waveguide (AWG) device 850. In some such embodiments, AWG device 850 is bisected along each path, wherein each path has a slightly different length than the other paths. In other embodiments, two or more polarization converters 820 are used, in a manner similar to that of FIG. 8B.

Figure 9A:
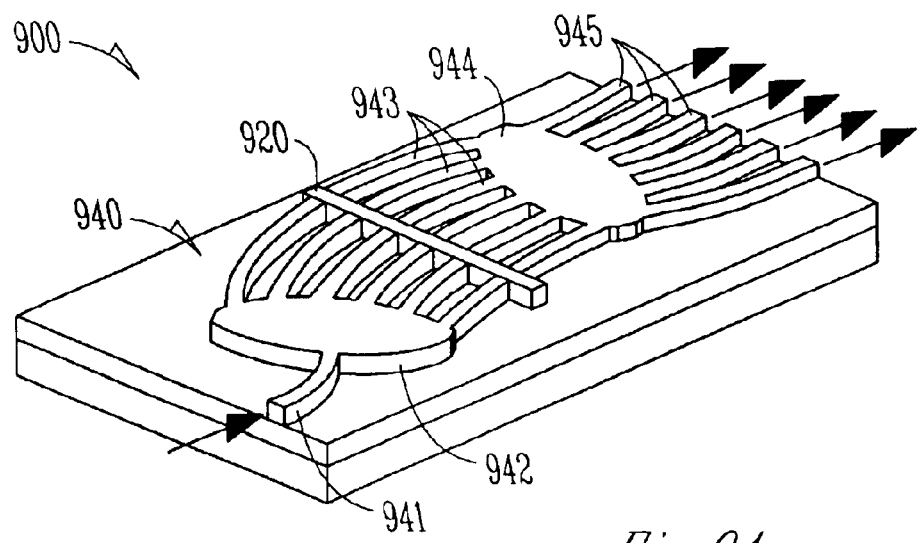
FIG. 9A shows a polarization compensated waveguide system 900 with a single polarization converter 920 bisecting waveguide device 940.

FIG. 9A shows a polarization compensated waveguide system 900 with a single polarization converter 920 bisecting waveguide device 940. Waveguide device is an arrayed waveguide device having a single input waveguide 941, a splitter 942, a plurality of unequal-length curved waveguide sections 943 each of which is bisected by ½ wave retardation plate (polarization converter plate) 920, combiner 944, and a plurality of output waveguides 945 each of which will output a slightly different wavelength of light extracted from the input light from waveguide 941. In this schematic, the wavelengths are marked red-orange-yellow-green-blue-violet, but in some embodiments, the wavelengths are much closer (on the order of 1 nanometer or less separating the color on each output waveguide 945), and more or fewer waveguides 943 and 945 are provided.

Figure 9B:
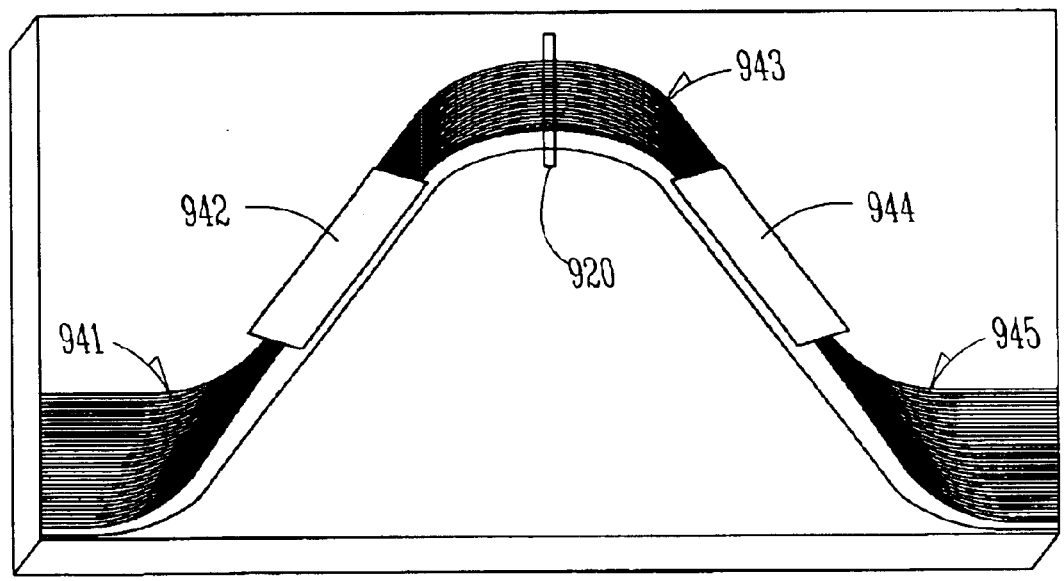
FIG. 9B shows a polarization compensated waveguide system 901 with a single polarization converter 920 each bisecting half of waveguide device 941.

FIG. 9B shows a polarization compensated waveguide system 901 with a single polarization converter 920 each bisecting half of waveguide device 941. This embodiment provides a plurality of input waveguides 941 each carrying one or more wavelengths. The input wavelengths can be in any order, but the device will separate the wavelengths and the output wavelengths will be ordered from longest to shortest wavelength on the respective output waveguides 945. As described for FIG. 9A, a polarization converter device 920 is formed in the middle of each of the plurality of curved waveguides 943, such that the polarization differential inserted by the left-hand portion of device 940 is compensated by the polarization differential in the right-hand portion of device 940. In other embodiments, each segment 941 and 945 are bisected by a polarization converter 920, as shown in FIG. 9C.

Figure 9C:
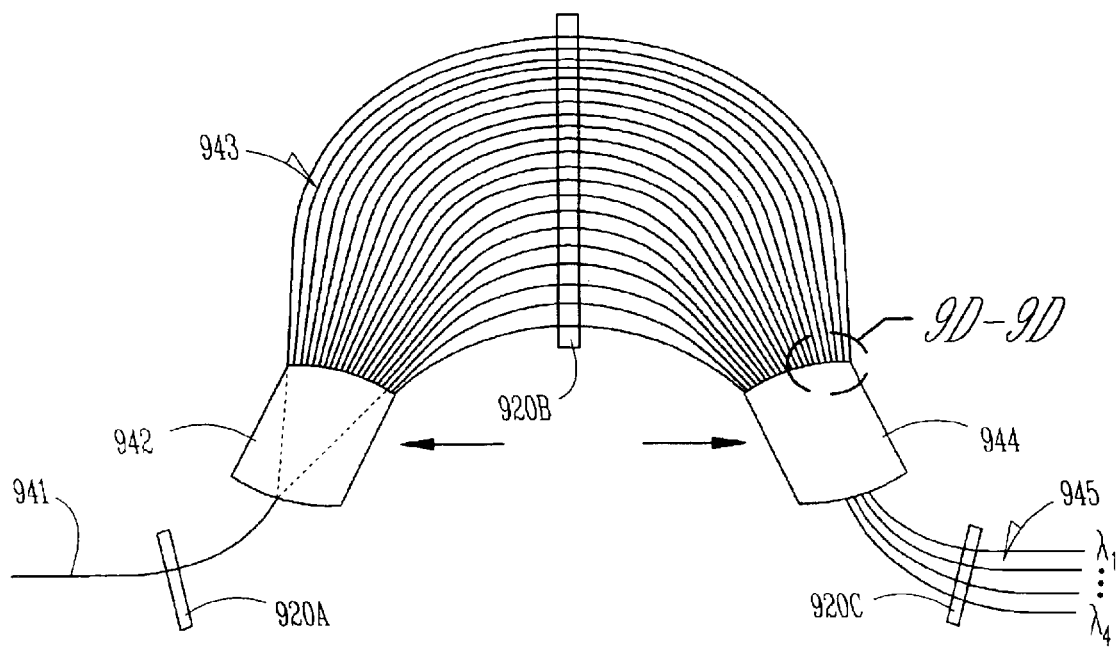
FIG. 9C shows a polarization compensated waveguide system 902 having three polarization converters 920 each bisecting a respective unequal-length portion of device 942.

FIG. 9C shows a polarization compensated waveguide system 902 having three polarization converters 920 each bisecting a respective unequal-length portion of device 942. Input waveguide 941 is bisected by a polarization converter 920A, placed at a location that compensates for polarization differential losses (or phase changes) in that portion of the device, each curved waveguide 943 has a slightly different length than the others, and each is bisected by a polarization converter 920B, and each output waveguide 945 is bisected by polarization converter 920C. In some embodiments, polarization converters 920A and 920C are placed in a position that also compensates for polarization differential losses of splitter 942 and combiner 944.

Figure 9D:
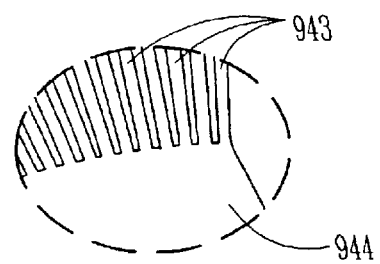
FIG. 9D shows an enlarged detail of a portion of the device of FIG. 9C

FIG. 9D shows an enlarged detail of portion of the device of FIG. 9C.

CONCLUSION

One aspect of the present invention provides a method that includes passing light through a first waveguide segment that differentially changes the amplitude and/or phase of the light relative to a first polarization orientation, passing the light through a thickness of oriented liquid crystal material sufficient to delay a first polarization component one-half wavelength relative to a second polarization component that is perpendicular to the first, wherein the first polarization component is at a forty-five degree angle to the first polarization orientation, and passing the light through a second waveguide segment that differentially changes the amplitude and/or phase of the light based on the polarization orientation.

In some embodiments of the method, the thickness of oriented liquid crystal material is sandwiched between a first thin transparent substrate and a second thin transparent substrate, such as shown in FIG. 1.

In some embodiments of the method, the thickness of oriented liquid crystal material is deposited in a slot in a waveguide, such as shown in FIG. 6.

In some embodiments of the method, a portion of the thickness of oriented liquid crystal material is deposited on one face of a first thin transparent substrate and the remaining portion is deposited on an opposing face, such as shown, for example in FIG. 7.

Some embodiments of the method, further include amplifying the light in the first waveguide segment and in the second waveguide segment; and providing feedback to form a laser, such as shown in FIG. 5.

In some embodiments of the method, the liquid crystal material swaps light having the first polarization orientation with light having a polarization orientation perpendicular to the first polarization orientation to compensate for a polarization-sensitive differential gain of the first and second waveguide segments. In some such embodiments, the first segment is substantially equal in length to the second segment, wherein the waveguide is formed substantially parallel to a surface of a substrate, and wherein a polarization component of the light parallel to the surface of the substrate is swapped with a polarization component of the light perpendicular to the surface of the substrate by the polarization converter, such as shown in FIG. 8A.

The present invention also provides an apparatus that includes a thin polarization converter that includes a thin first substrate that is substantially transparent to a wavelength of light, and a birefringent material deposited on one or more surfaces of the first substrate and oriented such that the polarization converter is substantially transparent to, and forms a half-wavelength birefringent plate for, the wavelength of light. For example, see FIG. 7.

In some embodiments of this apparatus, a first thickness of the birefringent material is deposited on a first major surface of the thin substrate and an equivalent thickness of the birefringent material is deposited on a second major surface the substrate opposite the first major surface of the substrate.

Some embodiments further include a gain medium and a feedback mechanism configured such that a light path through the gain medium, the polarization converter, and the feedback mechanism forms a laser.

Other embodiments further include a waveguide having a first segment and a second segment, wherein the polarization converter is placed between first segment and the second segment to compensate for a polarization-sensitive differential gain of the waveguide. In some such embodiments, the first segment is substantially equal in length to the second segment, wherein the waveguide segments are formed substantially parallel to a surface of a substrate, and wherein a polarization component of the light parallel to the surface of the third substrate is swapped with a polarization component of the light perpendicular to the surface of the substrate by the polarization converter.

The present invention also provides an apparatus that includes a thin polarization converter that includes a first substrate surface, a second substrate surface, and a liquid crystal material sandwiched between the first substrate surface and the second substrate surface such that the polarization converter is substantially transparent to, and forms a half-wavelength birefringent plate for, a wavelength of light. See, for example, FIGS. 1 and 6.

In some embodiments, the first substrate surface is a major surface of a first thin substrate and the second substrate surface is a major surface of a second thin substrate. See, for example, FIG. 1.

Some embodiments further include a gain medium, and a feedback mechanism configured such that a light path through the gain medium, the polarization converter, and the feedback mechanism forms a laser.

Some embodiments of this apparatus further include a waveguide having a first segment and a second segment, wherein the polarization converter is placed between first segment and the second segment to compensate for a polarization-sensitive differential gain of the waveguide.

In some embodiments, the first segment is substantially equal in length to the second segment, wherein the waveguide segments are formed substantially parallel to a surface of a substrate, and wherein a polarization component of the light parallel to the surface of the third substrate is swapped with a polarization component of the light perpendicular to the surface of the substrate by the polarization converter.

Some embodiments of the apparatus (such as shown in FIG. 6), further include a substrate 601 having a waveguide 640 formed therein, and having a slot 614 transverse to the waveguide 640, wherein the first substrate surface is one face 611 of the slot and the second substrate surface is an opposing face 613 of the slot, and wherein the polarization converter 620 is formed in the slot 614 in the substrate 601 by the liquid crystal material 610 sandwiched between the faces of the slot.

In some embodiments, the faces of the slot are pre-treated such that the liquid crystal material self aligns to an orientation that swaps a first polarization component of the light with a second polarization component of the light that is perpendicular to the first polarization component.

In some embodiments, the waveguide includes a gain medium, and the apparatus further includes a feedback mechanism, such as shown in FIG. 5, configured such that a light path through the gain medium, the polarization converter, and the feedback mechanism forms a laser.

In some embodiments, the waveguide includes a first segment and a second segment, wherein the polarization converter is placed between first segment and the second segment to compensate for a polarization-sensitive differential gain of the waveguide.

In some embodiments, the waveguide includes a first segment and a second segment, wherein the polarization converter is placed between first segment and the second segment to compensate for a polarization-sensitive propagation loss of the waveguide.

In some embodiments, the first segment is substantially equal in length to the second segment, wherein the waveguide is formed substantially parallel to a surface of the substrate, and wherein a polarization component of the light parallel to the surface of the substrate is swapped with a polarization component of the light perpendicular to the surface of the third substrate by the polarization converter.

It is understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method comprising:
   depositing a film of liquid crystal material in a solvent onto one or more surfaces;
   orienting a polarization direction of the liquid crystal material; and
   removing the solvent to leave a thickness of solid liquid crystal material sufficient to delay a first polarization component one-half wavelength relative to a second polarization component that is perpendicular to the first polarization component.

2. The method of claim 1, wherein the thickness of solid liquid crystal material is sandwiched between a first thin transparent substrate and a second thin transparent substrate.

3. The method of claim 1, further comprising:
   propagating light through a first waveguide segment, the solid liquid crystal material, and a second waveguide segment;
   amplifying the light in the first waveguide segment and in the second waveguide segment; and
   providing feedback to form a laser.

4. The method of claim 1, wherein the thickness of solid liquid crystal material is deposited in a slot in a substrate, wherein the substrate has a waveguide, and wherein the slot is transverse to the waveguide between a fist waveguide segment and a second waveguide segment, and wherein the liquid crystal material swaps light having a first polarization orientation with light having a polarization orientation perpendicular to the first polarization orientation to compensate for a polarization-sensitive differential gain of the first and second waveguide segments.

5. The method of claim 4, wherein the first waveguide segment is substantially equal in length to the second waveguide segment, wherein the waveguide is formed substantially parallel to a surface of the substrate, and wherein a polarization component of light parallel to the surface of the substrate is swapped with a polarization component of the light perpendicular to the surface of the substrate of the substrate by the liquid crystal material.

6. An apparatus comprising:
   a thin polarization converter that includes:
      a thin first substrate that is substantially transparent to a wavelength of light; and
      a birefringent material deposited on one or more surfaces of the substrate and oriented such that the polarization converter is substantially transparent to, and forms a half-wavelength birefringent plate for, the wavelength of light; and
   a waveguide having a first segment and a second segment, wherein the polarization converter is placed between the first segment and the second segment to compensate for a polarization-sensitive differential gain of the waveguide.

7. The apparatus of claim 6, wherein the first segment is substantially equal in length to the second segment, wherein the waveguide segments are formed substantially parallel to a surface of the substrate, and wherein a polarization component of the light parallel to the surface of the substrate is swapped with a polarization component of the light perpendicular to the surface of the substrate by the polarization converter.

8. An apparatus comprising:
   a thin polarization converter that includes:
      a first substrate surface;
      a second substrate surface; and
      a liquid crystal material sandwiched between the first substrate surface and the second substrate surface such that the polarization converter is substantially transparent to, and forms a half-wavelength birefringent plate for, a wavelength of light; and
      a waveguide having a first segment and a second segment, wherein the polarization converter is placed between the first segment and the second segment to compensate for a polarization-sensitive differential gain of the waveguide.

9. The apparatus of claim 8, wherein the first substrate surface is a major surface of a first thin substrate and the second substrate surface is a major surface of a second thin substrate.

10. The apparatus of claim 8, further comprising:
    a gain medium; and
    a feedback mechanism configured such that a light path through the gain medium, the polarization converter, and the feedback mechanism forms a laser.

11. The apparatus of claim 8, wherein the first segment is substantially equal in length to the second segment, wherein the waveguide segments are formed substantially parallel to a surface of a substrate, and wherein a polarization component of the light parallel to the surface of the substrate is swapped with a polarization component of the light perpendicular to the surface of the substrate by the polarization converter.

12. The apparatus of claim 8, further comprising a substrate having the waveguide formed therein, and having a slot transverse to the waveguide, wherein the first substrate surface is one face of the slot and the second substrate surface is an opposing face of the slot, and wherein the polarization converter is formed in the slot in the substrate by the liquid crystal material sandwiched between the faces of the slot.

13. The apparatus of claim 12, wherein the faces of the slot are pre-treated such that the liquid crystal material self aligns to an orientation that swaps a first polarization component of the light with a second polarization component of the light that is perpendicular to the first polarization component.

14. The apparatus of claim 12, wherein the waveguide includes a gain medium, the apparatus further comprising:
    a feedback mechanism configured such that a light path through the gain medium, the polarization converter, and the feedback mechanism forms a laser.

15. The apparatus of claim 12, wherein the first segment is substantially equal in length to the second segment, wherein the waveguide is formed substantially parallel to a surface of the substrate, and wherein a polarization component of the light parallel to the surface of the substrate is swapped with a polarization component of the light perpendicular to the surface of the substrate by the polarization converter.

16. A method comprising:

passing light through a first waveguide segment that differentially changes an amplitude of the light relative to a first polarization orientation;

passing the light through a thickness of oriented liquid crystal material sufficient to delay a first polarization component one-half wavelength relative to a second polarization component that is perpendicular to the first polarization component, wherein the first polarization component is at a forty-five degree angle to the first polarization orientation; and passing the light through a second waveguide segment that differentially changes the amplitude of the light based on the polarization orientation.

17. The method of claim 16, wherein the thickness of oriented liquid crystal material is sandwiched between a first thin transparent substrate and a second thin transparent substrate.

18. The method of claim 16, further comprising:

amplifying the light in the first waveguide segment and in the second waveguide segment; and providing feedback to form a laser.

19. The method of claim 16, wherein the liquid crystal material swaps light having the first polarization orientation with light having a polarization orientation perpendicular to the first polarization orientation to compensate for a polarization-sensitive differential gain of the first and second waveguide segments.

20. The method of claim 19, wherein the first waveguide segment is substantially equal in length to the second waveguide segment, wherein the first and second waveguide segments are formed substantially parallel to a surface of a substrate, and wherein a polarization component of the light parallel to the surface of the substrate is swapped with a polarization component of the light perpendicular to the surface of the substrate.

* * * * *

UNITED STATES PATENT AND TRADEMARK OFFICE
CERTIFICATE OF CORRECTION

PATENT NO. : 6,928,200 B2
DATED : August 9, 2005
INVENTOR(S) : Vodrahalli et al.

It is certified that error appears in the above-identified patent and that said Letters Patent is hereby corrected as shown below:

Column 11,
Line 39, delete "fist" and insert -- first --, therefor.
Line 52, after "surface" delete "of the substrate".
Line 56, after "thin" delete "first".

Column 13,
Line 16, after "the" insert -- first --.

Signed and Sealed this

Twenty-fifth Day of October, 2005

JON W. DUDAS
*Director of the United States Patent and Trademark Office*